C. F. POTTER.
DOUBLE WALLED ENAMEL LINED CONTAINER.
APPLICATION FILED JULY 13, 1911.
1,041,347.
Patented Oct. 15, 1912.
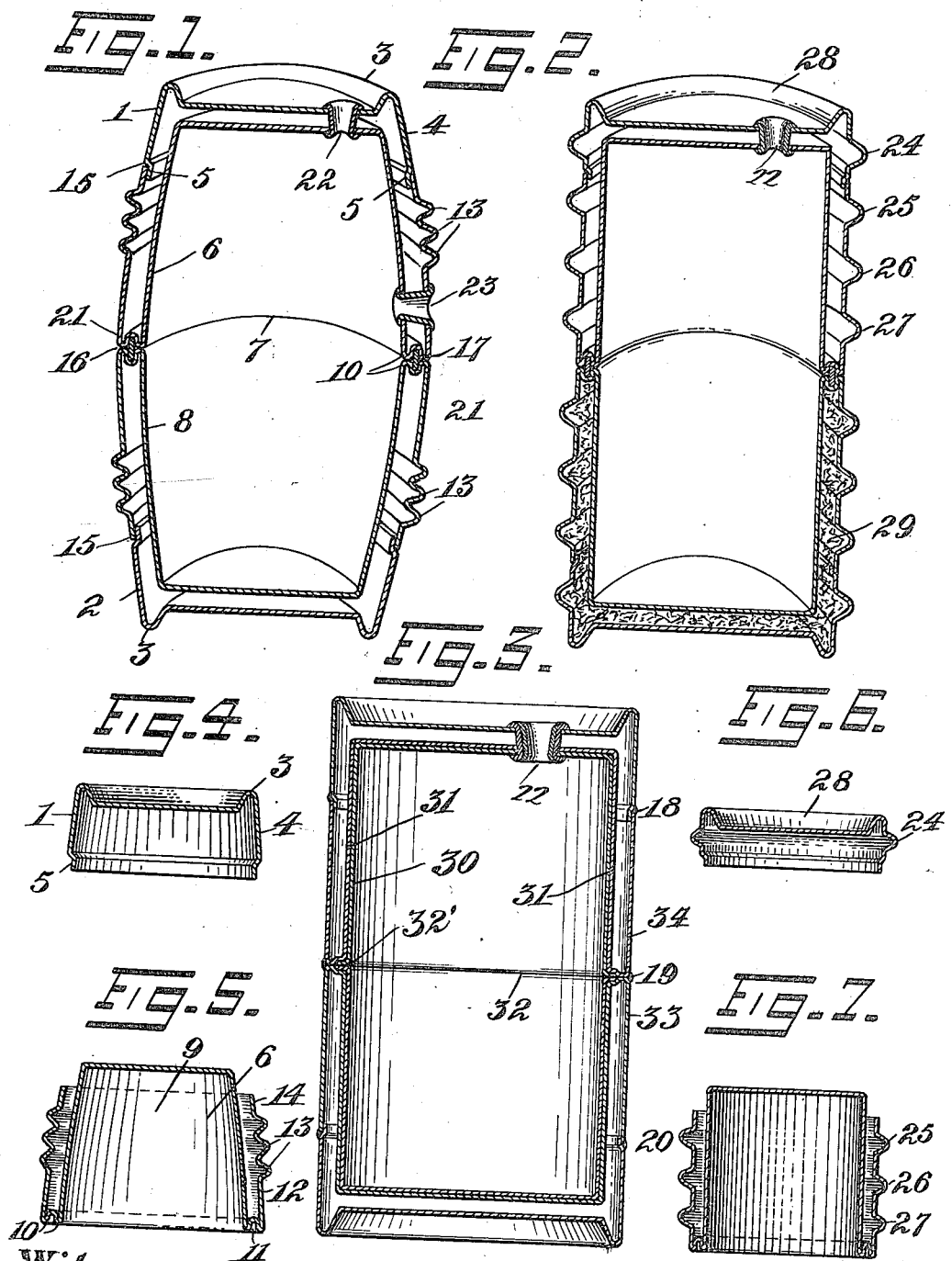
Witnesses:
Frank C. Palmer
H. D. Penney
By his Attorney
Inventor:
Charles F. Potter,
F. H. Richards.

UNITED STATES PATENT OFFICE.

CHARLES F. POTTER, OF WOODHAVEN, NEW YORK.

DOUBLE-WALLED ENAMEL-LINED CONTAINER.

1,041,347.	Specification of Letters Patent.	Patented Oct. 15, 1912.

Application filed July 13, 1911. Serial No. 638,240.

*To all whom it may concern:*

Be it known that I, CHARLES F. POTTER, a citizen of the United States, residing in Woodhaven, in the county of Queens and State of New York, have invented certain new and useful Improvements in Double-Walled Enamel-Lined Containers, of which the following is a specification.

My present invention relates to an improvement in containers, wherein the said containers are comprised of an inner and outer shell composed of steel or other metal, and being drawn up from a plurality of flat sheets of a suitable thickness and welding the same into a single unit, I am enabled to produce a lighter and more lasting article than has heretofore been possible.

Another feature of this improvement is that owing to the material used, the interior of the inside shell, which I call the receptacle portion, may be lined with any suitable vitreous material, such as porcelain, glass, etc., and it is thereafter protected against being chipped or scaled off by reason of blows or external violence, being protected from the same by the outer shell which I term the protective shell.

A further advantage is that owing to the material used, I am still further enabled to strengthen the outer or protective shell by means of corrugations or transverse flutings, thus lending stiffness and rigidity, and by arranging the said corrugations in certain manner to be hereinafter described, I am enabled to reinforce and protect any of the weaker portions of the said outer shell that require any such protection.

A further advantage is, that by my present construction I am enabled to make a container with but one break or crevice in its walls. I am aware that metal containers have been made heretofore that were glass or enamel lined, but none of them have had the enamel or porcelain lined receptacle protected by an outer shell portion entirely insulated by an air space all around between the inner and outer walls thereof, after the manner herein described.

A further advantage is that due to the forms of component parts of the completed structure which cause all of the joints that are desired to be welded to come at the outside of the outer protective portion of the container, and the thickened portion of these welded joints also give greater strength to the outer protective wall or shell.

In the drawings accompanying Figure 1 is a section taken through one form of my improved container. Fig. 2 is another section taken through a modified form. Fig. 3 is another section taken through another modified form of my container. Fig. 4 is a sectional view of one of the end pieces forming the outer wall. Fig. 5 is a sectional view of a half portion of the container. Fig. 6 is another view of another form of an outer end portion of the container. Fig. 7 is a sectional view of another form of a half portion of the container.

In Fig. 1 is shown a form of container, preferably of the round type, approximating in form generally the type of container known as a beer keg or barrel. It will be noted that the two ends 1 and 2 are duplicates and similar to that shown in section in Fig. 4. A protective rim 3 is raised on the heads of the end members, thus stiffening the said members and forming a downward extension 4 of said edge 3 which forms a side wall portion, and an inset rim 5 is formed at the lower edge portion thereof. The receptacle portion 6 is like its upper protective head member 1, arranged to be drawn out of one sheet of metal, thus leaving no crevices or joining lines at any other portion of its receptacle, except at the line 7 where a like receptacle unit 8 adjoins thereto. In Fig. 5 these two members 6 and 8 are shown as being formed of the internal or chambered portion 9, the walls of said chamber being turned outwardly and forming a flange portion denoted generally by 10, said flange portion having a seat or channel 11 therein, the wall of metal being then turned back upon itself, as at 12, and being corrugated or swaged, as at 13, and then finished off into a straight edge portion 14, said portion 14 fitting into the inset 5 of the cap members 1 and 2 in Fig. 1. It will be noted that these two members at the point of external engagement present a smooth or flush contour, as at 15, and that similar conditions exist at the point of juncture of the two container members, as at 16. It will further be noted that an annular ring member 17 is arranged between the two container members 6 and 8 in such manner as to cause the edges 10 to register or engage one another in alinement. This ring member further stiffens the two meeting edges and also prevents the forcing sidewise or apart of the two half members 6 and 8, after being welded at point 16, and forms an interlocking means therebetween.

After the structure is assembled, as before mentioned, by use of suitable welding apparatus, such as electric or oxyacetelene, I weld the joints as indicated at 18, 19, and 20, Fig. 3. This joint may be formed by either welding the adjoining walls to ecah other or by filling in the space therebetween, and welding the abutting edges or walls in combination with new metal placed therein. It will be noted that this operation leaves the container in practically one piece and of very stiff or rigid construction, with but a minimum amount of crevices where leakage may take place to the interior of said container.

In enameling the half interior or receptacle portions, I cover all of flange portion with enamel up to the point of actual contact and welding, thus, while fluid may reach into the crevice the smallest amount of bare metal is exposed, as shown at 32' and 19, Fig. 3. Or I can enamel the interior of the container after the completion of the same as regards welding and bushings, thus having an unbroken liquid resistant lining.

The corrugated members 13 are here shown grouped near the middle of each of the half units and it will be noted that they project a slight distance beyond the center portion of the container, as at 21, thereby affording protection to the said outer portion. Bushings 22 and 23 suitably affixed between the inner and outer walls of the container afford means for filling, emptying, and stoppering, as required.

In Fig. 2 the construction is similar to that indicated in Fig. 1, with the exception of the corrugated members 24, 25, 26, and 27, they being so arranged as to be evenly spaced along the entire length of a single half of the container; one of the corrugations 24 being integrally formed in the head or cap portion 28 of the outer shell.

While I have shown in the three principal views that an interior air space may be retained about the inner and upper members, this space or compartment may be filled with a suitable material, such as asbestos, or the like, as indicated in Fig. 2 at 29, wherein the lower half of the container is shown filled with the above mentioned material.

In Fig. 3 is shown an enamel lined container, a wall of vitreous material 30 being attached to the metal wall 31 in the usual manner and at the point of juncture 32, being turned inwardly and there abutting one another, as at 32'. The metal portion 31 is formed as was described for Figs. 1, 2, and 5, with the exception of the abutting walls which are in flat engagement with one another. After being welded, as before described, it can be seen that this receptacle with its fragile lining is well protected against injury by violence from rough handling, by the outer spaced protective shell.

In construction I prefer to make these containers of sheet steel of comparatively light gage, and after assembling and welding, the outer shell or protective covering is made rust proof by proper treatment, such as galvanizing, and the entire structure will then be one of great wearing qualities, being practically indestructible and of moderate cost.

It will be noted that, due to the flange or support formed at the central portion of the receptacle, the container portions 6 and 8 are centrally suspended thereat, and that with the exception of the bushings or other means that may be used for entering the interior of the container there is no other point of contact with the outer shell. This construction favors the carrying therein of such fluids as need protection from the variable changes in temperature, etc., as well as preventing loss by evaporation and breakage.

Having thus described my invention, I claim:

1. A double walled container comprised of duplicate shells, each shell having an inner receptacle portion and an outer protective shell therefor, said outer shell being formed by reversed extensions of said inner shell, thereby forming a space between said outer and said inner shells, a connecting flange between said inner and outer shells formed integral with said inner shell and the said reversed extension, said flange forming a single centrally located annular means for support of the inner receptacle formed by said shells, and also forming means for connecting the two duplicate halves to one another.

2. A double walled container comprised of duplicate members, each of said duplicate members having an inner receptacle portion and an outer protective shell therefor, said outer protective shell being formed by a reversed extension of the said inner receptacle portion, and integral flanges formed between said inner and outer shells, said flanges forming means for attaching said duplicates together, whereby said container is centrally suspended in said outer shell.

3. A double walled container comprised of duplicate inner shells having reversed outer portions forming outer protective shells and abutting their edges at the middle of said container, and duplicate head members having annular extending side portions arranged to be connected to said reversely arranged outer portions.

4. A double walled container comprised of duplicate inner shells forming an inner receptacle, each of said duplicate inner shells having a reversed outer portion forming outer protective shells and abutting at their edges at the middle thereof, said edges adapted to receive therein a sealing means, and duplicate head members having annular extending side portions arranged to be connected to said reversely arranged outer portions.

5. A double walled container comprised of four drawn metallic portions, two of said portions comprised of duplicate inner shells forming an inner receptacle, each of said duplicate inner shells having reversed outer portions forming outer protective shells and abutting at their edges at the middle thereof, and duplicate beaded heads or ends having annular flanged extensions, said extensions having annular seats therein and adapted to receive said outer extension walls of said inner receptacle members, the junctures formed thereby, together with the juncture formed by the said duplicate head members, being externally arranged on the outer walls of said container and being adapted to be welded.

6. A double walled container comprised of four drawn metallic portions, two of said portions forming the inner receptacle portion and having reversed extensions forming an outer protective shell, the other of the two said portions forming the heads of said outer protective shell, the same forming externally arranged junctures, said junctures being welded, and the sides and ends of said outer protective shell being convoluted for the purpose described.

7. In a double walled container, an inner vitreously lined receptacle portion and an outer protective shell therefor, said receptacle portion being comprised of two duplicate shell members, said outer protective shells being formed of extensions of the walls of said receptacle portions being turned back upon themselves, said shells being joined together at their edges near the middle and having arranged in the said edges an annular groove or channel adapted to receive therein sealing means, and duplicate beaded heads or ends having annular flanged extensions, said extensions having annular seats therein and adapted to receive said outer extension walls of said inner receptacle members.

8. In a double walled container comprised of an inner vitreously lined receptacle portion cylindrically formed of two duplicate parts, and extensions of the walls of the said inner portions being turned back upon themselves to form a part of the outer protective container shell thereof, having at their points of contact an annular groove or channel adapted to receive therein sealing means, and duplicate beaded heads or ends having annular flanged extensions, said extensions having annular seats therein and adapted to receive said outer extension walls of said inner receptacle members, said inner receptacle members and said head or end members being welded to form a unit container.

9. In a double walled container comprised of an inner vitreously lined receptacle portion cylindrically formed of two duplicate parts, extensions of the walls of the said inner portions being turned back upon themselves to form a part of the outer protective container shell thereof, having at their points of contact an annular groove or channel adapted to receive therein sealing means, and duplicate beaded heads or ends having annular flanged extensions, said extensions having annular seats therein and adapted to receive said outer extension walls of said inner receptacle members, said inner receptacle members and said head or end members being welded to form a unit container and having bushings affording entry into the inner receptacle, said bushings being in fixed engagement with the inner and outer shells thereof.

10. In a double walled container comprised of an inner vitreously lined receptacle portion cylindrically formed of two duplicate parts, and extensions of the walls of the said inner portions being turned back upon themselves to form a part of the outer protective container shell thereof, having at their points of contact an annular groove or channel adapted to receive therein sealing means, and duplicate beaded heads or ends having annular flanged extensions, said extensions having annular seats therein and adapted to receive said outer extension walls of said inner receptacle members, said inner receptacle members and said head or end members being welded to form a unit container, all of the welding points being arranged to come at the exterior of said container.

11. In a double walled container comprised of an inner vitreously lined receptacle portion cylindrically formed of two duplicate parts the same being joined together at the middle thereof, extensions of the walls of said inner portions being turned back upon themselves to form an outer protective container shell thereof, said shells having at their points of juncture an inter-locking means, and duplicate beaded heads or ends having annular flanged extensions, said extensions having annular seats therein and adapted to receive said outer extension walls of said inner receptacle members.

12. In a double walled container comprised of an outer and inner shell, said inner shell being composed of duplicate members having reversed extensions forming said outer shell, and intermediate integral flanges connecting said inner and outer shells, said inner shells being centrally suspended in the interior of said outer shell by said integrally formed flanges, annular grooves or channels arranged in said flanges, and an annular ring located in said grooves thereby to form an inter-lock between the said duplicate members.

CHARLES F. POTTER.

Witnesses:
  EDWARD D. POTTER,
  CHAS. J. SAUER.